Dec. 9, 1958        A. E. VAN ANTWERP        2,863,738

APPARATUS FOR CONDUCTING CHEMICAL REACTIONS

Filed Oct. 28, 1954                                  2 Sheets-Sheet 1

INVENTOR.
ARTHUR E. VAN ANTWERP
BY
ATTY.

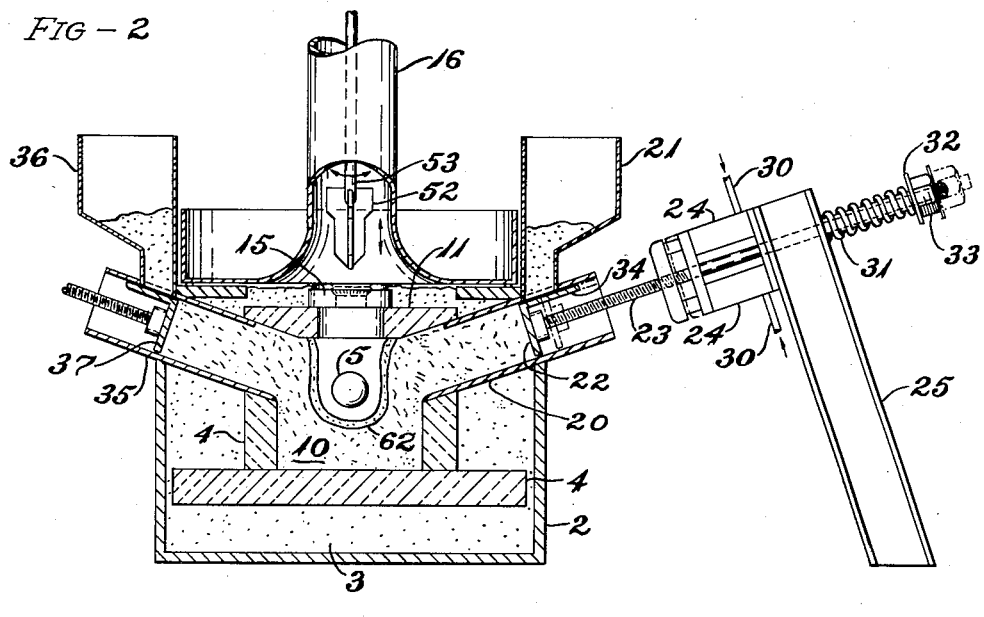
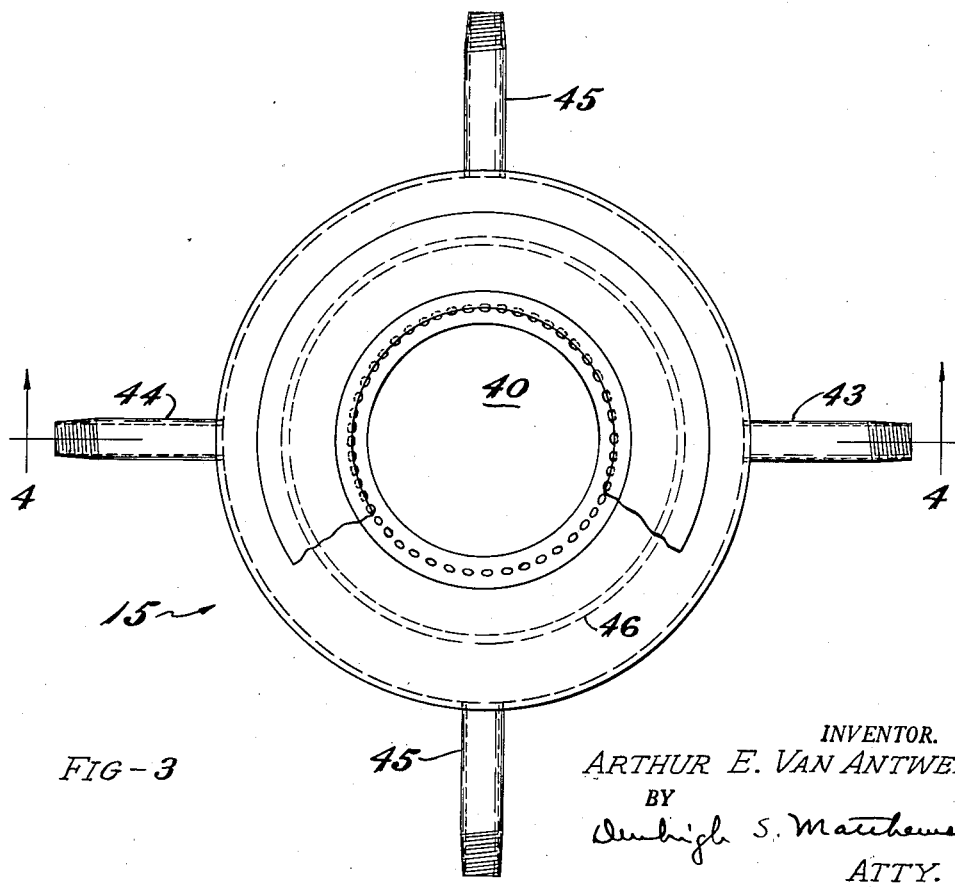

United States Patent Office 2,863,738
Patented Dec. 9, 1958

2,863,738

APPARATUS FOR CONDUCTING CHEMICAL REACTIONS

Arthur E. Van Antwerp, Cuyahoga Falls, Ohio, assignor to The B. F. Goodrich Company, New York, N. Y., a corporation of New York Application October 28, 1954, Serial No. 465,370

7 Claims. (Cl. 23—277)

The present invention relates to apparatus for producing particulate, solid silicon dioxide containing materials. More particularly, this invention relates to apparatus for producing particulate solid silicon dioxide of controlled particle size and surface area.

The employment of silica as a reinforcing pigment in rubbery compositions for making shoe soles, tire treads, belts and the like has been largely limited due to the difficulty of obtaining silica in the requisite particle sizes or of the requisite surface area. Such silicas exhibit a low level of reinforcement and, hence, are primarily used as fillers. For example, Potter in "Transactions of the American Electrochemical Society," vol. XII, 1907, page 224, discloses that clouds of fine silica may be produced if the silicon monoxide and carbon monoxide gases from an arc furnace are discharged into the atmosphere. In his U. S. Patent No. 875,674 he also states that silica may be obtained by blowing air through an electric furnace in which the silicon monoxide is being produced. However, in these processes the silica obtained comprises a considerable proportion of large particle size—low surface area material which cannot readily be separated from the fine particle size material so that the product is generally useful only as a filler in rubbery compositions. Methods of blowing silicon monoxide gas to obtain silica are also disclosed in the U. S. patents to Reik et al., No. 2,428,178, and to Porter, No. 2,573,057. In these patents, air is injected into the gas stream issuing from the furnace to cause oxidation of the silicon monoxide to silicon dioxide. However, like the Potter methods of oxidation, the indiscriminate mixing of air or other oxidizing gases with silicon monoxide as taught by these references gives rise to a large amount of low surface area material mixed with fine particles. No means are disclosed to control the particle size of the silica to obtain a definite range. Moreover, these prior art processes are batch type processes and, hence, do not lend themselves well to efficient large scale continuous production.

An object of this invention is to provide a novel apparatus useful in producing finely-divided silicon dioxide of large surface area.

A further object is to provide an apparatus containing means for controlling the particle size of particulate, solid silicon dioxide to be obtained from silicon monoxide gas.

A still further object is to provide an apparatus for obtaining silicon dioxide of a generally constant average particle size and surface area and which is essentially free of particles of other average size and surface area.

Again, an object is to provide an apparatus for continuously producing silicon dioxide of a given particle size.

Yet again an object is to provide an apparatus for improving the thermal efficiency of the process for producing amorphous silicon dioxide.

These and other objects and advantages of the present invention will become more apparent to those skilled in the art from the following detailed description, examples and drawings wherein:

Fig. 2 is a vertical sectional view, partly in elevation, of the apparatus of Fig. 1 taken at right angles to the view of the apparatus of Fig. 1 and showing the position of the raw material feeding means of the apparatus;

Fig. 3 is a top plan view of the means for controlling particle size; and

It has now been discovered according to the present invention that, by rapidly cooling and diluting silicon monoxide gas with an oxidizing gas by supplying a plurality of jets of oxidizing gas which converge at a point about the silicon monoxide gas stream without creating any appreciable positive or negative pressure on the gas in the furnace and by increasing the rate of flow of the silicon monoxide gas as it leaves the furnace by restricting the size of the furnace opening, it is possible to obtain silicon dioxide of constant, very fine average particle size and constant, average high surface area. By varying the size of the orifice through which the silicon monoxide gas escapes, the number of oxidizing gas jets, the flow rate of the oxidizing gas, and the angle at which the jets of oxidizing gas converge on the stream of silicon monoxide gas, silicon dioxide of the desired average particle size and surface area range can be produced. Moreover, by supplying fresh feed material into the furnace to force the hot unreacted portion of the charge near the arc or reaction zone to shape the crater so that a minimum amount of the electrodes are exposed, a constant supply of material is made available near the arc to produce silicon monoxide gas at a generally constant rate and also to thereby reduce the amount of heat radiated or lost to the furnace walls and to increase the amount available for the reaction process.

Figure 1:
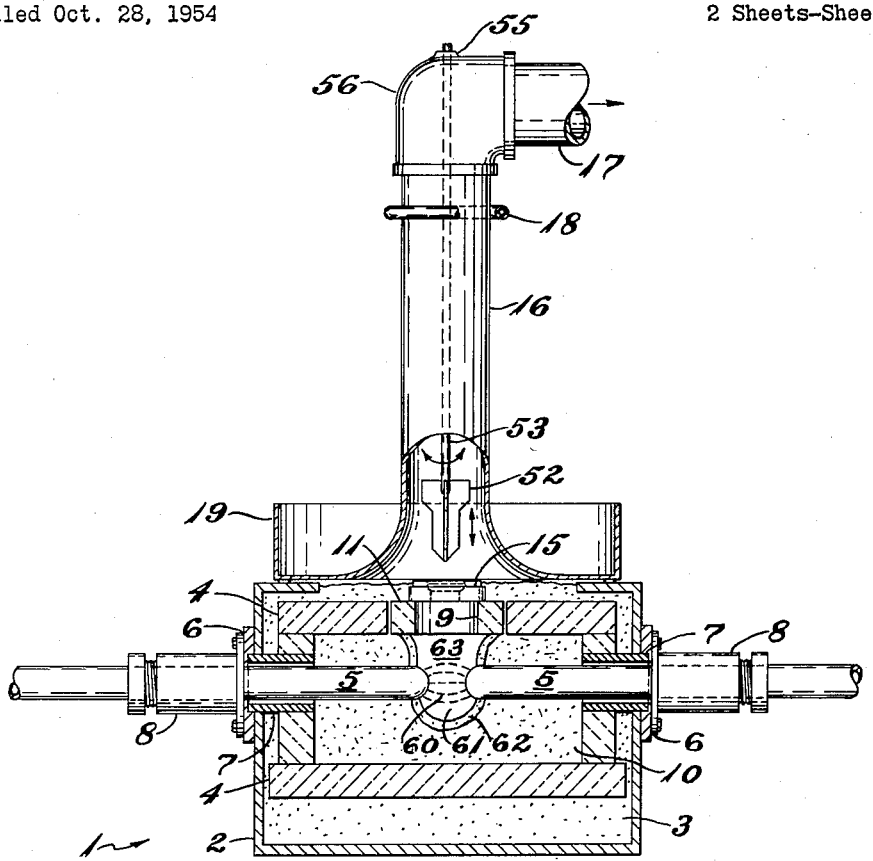
Fig. 1 is a vertical sectional view, partly in elevation, of the apparatus of the present invention showing the position of the electrodes.

As shown in the drawings, Figs. 1 and 2, the apparatus employed in practice of the present invention comprises a circular furnace, generally indicated at 1, having steel shell, side and bottom, 2 containing sand or other refractory 3 enclosing reaction chamber 4 of carbon, graphite, Alundum and the like. Carbon electrodes 5—5 pass through the shell and into the reaction chamber and are connected to a suitable source of electric power not shown. The electrodes are insulated by means of washers 6—6 and sleeves 7—7 from the steel shell and from the graphite reaction chamber and are water cooled by means of glands 8—8. The interior of the reaction chamber, except for the area adjacent the tips of the electrodes and opening or port 9 comprises generally mixture 10 of about equal molecular weights of carbon and sand.

Mounted on cover member 11 of the roof portion of the reaction chamber about port 9 is the oxidizing gas mixer, generally indicated at 15, which will be discussed below in greater detail with regard to Figures 3 and 4. The top portion of the furnace is covered with refractory material and extending about and from the top is conduit 16 in which the solid silicon dioxide is carried away to conduit 17 and delivered to a collection device not shown, such as a bag collector, screen, and the like, which separates it from the carbon dioxide and/or carbon monoxide gas produced in the reaction and the remaining oxidizing gas. If desired, the sides of conduit 16 may be cooled by means of a water spray from circular water pipe 18 and the water can be collected in trough 19 and discharged by means of suitable piping to waste.

At right angles to or on the side of the furnace 90° from the electrodes is feed channel 20 which passes through the side of the furnace into the reaction chamber and generally slopes downward to facilitate feeding. Hopper 21 is mounted on the outer end of the feed channel and serves to deliver a fresh mixture of carbon and sand to the feed channel as needed. The mixture is moved into the reaction chamber by means of ram 22 actuated through push rod 23 connected to hydraulic cylinders 24—24, operating on 3,000–12,000 pounds pressure or higher, carried by support 25. Pipes 30—30 deliver hydraulic fluid to the hydraulic cylinders, and are connected to a lever operated pump run by a "Bellows" air motor (not shown). Also not shown are a timer which may be used to control the feed rate and a control for the air pressure which may be provided to limit the feed pressure to the furnace. Spring 31 carried on the end of the push rod and bearing against washer 32 restrained by nut 33 on the rod and bearing against the side of the support serves to retract the ram when the pressure is released. The ram also carries plate 34 which acts as a gate to close off the lower end of the hopper when the ram forces a fresh charge of reaction mixture into the reaction chamber. A second feed channel 35 is positioned in the furnace across from feed channel 20 to deliver sand and carbon from hopper 36 by means of ram 37 actuated by a hydraulic cylinder (not shown) into the reaction chamber. Additional feeding means can also be positioned on the furnace to supply fresh reaction material to the reaction chamber to aid further in shaping the cavity and improving thermal efficiency.

Figure 4:
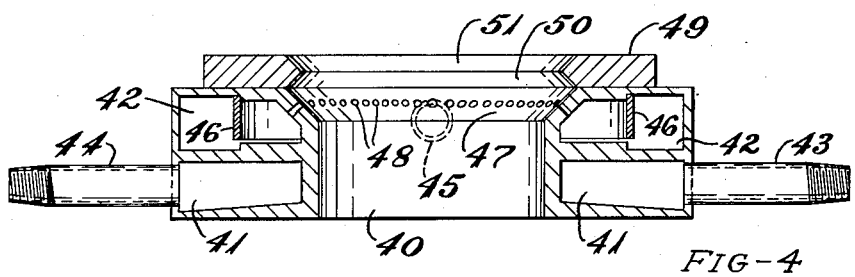
Fig. 4 is a vertical sectional view taken along the lines 4—4 of Fig. 3.

The oxidizing gas mixer, or jet ring, 15 referred to previously is disclosed in greater detail in Figs. 3 and 4 of the drawings. It is mounted on the top of the furnace about port 9 and is of generally cylindrical form having a channel 40 through its center coinciding with the center of said port. The jet ring has a restricted internal diameter which is generally smaller than the diameter of the port to control gas velocity from the furnace and to decrease the amount of radiation from the furnace to permit more rapid cooling. It contains two, circular, separate enclosed chambers 41 and 42. Chamber 41 is connected by means of pipe 43 to a suitable source of water or other medium for cooling the ring to prevent warping and to keep silica from fusing on the ring and is provided with an outlet pipe 44 for discharging heated water to waste. Chamber 42 is connected by means of one or more pipes 45—45 to a suitable source of oxidizing gas under pressure which fills the chamber and is distributed evenly therein by means of vertically positioned circular baffle plate 46. The upper inner portion or side 47 of the jet ring is inclined at about an angle of 45° to the axis of the ring and contains a plurality of small ports 48—48 about its periphery and which have been drilled or otherwise formed perpendicularly to the surface of side 47 to deliver a plurality of streams of the gas at an angle of about 45° to meet at a point above the jet ring and to mix with the stream of silicon monoxide gas issuing from the furnace. Ring-like wear plate 49 is mounted on the upper surface of the jet ring and serves to prevent distortion or wear of the hot jet ring which is near the temperature of metal flow during operation when the scraper is used as described below. The center of its axis coincides with the center of the axis of the jet ring and to mix with the stream of silicon monoxide clined to provide angular surfaces projecting toward the center of the ring.

Rotatable scraper 52 mounted on one end of shaft 53 is positioned centrally in conduit 16 above air mixer 15 and can be lowered to scrape the side of channel 40 of the air mixer and beveled surface 51 of wear plate 49. The scraper serves to remove deposits of silica which may tend to build up during operation to form a hollow cone-shaped mass of material which may cause a cessation of operations or loss of control of the mixing of the oxidizing gas and silicon monoxide gas or may take other shapes which alter the degree and kind of mixing. Shaft 53 passes out of conduit 16 by means of bearing 55 in elbow 56 connecting conduits 16 and 17 and is attached to suitable means such as a motor or crank to effect rotation of the shaft as well as to suitable means such as a lever to afford vertical reciprocation of the shaft.

In operation of the apparatus shown in Figs. 1 to 4, the power is turned on with the electrodes touching each other and then the electrodes are moved slightly apart to form arc 60 and start the reaction between the carbon and silica. The material closest to the arc reacts, vaporizes out of the furnace and leaves crater 61 around the arc. The gases pass through port 9 in the top of the furnace. Cooling water is circulated through chamber 41 in the jet ring. Oxidizing gas is then pumped to the jet ring and emerges as a plurality of high speed jets to mix with the silicon monoxide gas as it passes through the restricted central opening of the ring which increases its velocity. The silicon monoxide is oxidized and condensed to solid, particulate, silicon dioxide while the carbon monoxide is oxidized to carbon dioxide. The stream of residual oxidizing gas, carbon dioxide, any remaining carbon monoxide and particulate, solid, silicon dioxide is then conveyed by the conduits to a bag collector which separates the silicon dioxide from the other gases which are discharged to the atmosphere. Cold feed, supplied from the walls and through the intermittent or continuous action of the ram, forces the hottest part of the feed close to the arc to continue the reaction, to maintain the supply of silicon monoxide gas, to control the shape of the reaction cavity and to maintain thermal efficiency. Thus, supplying feed to the furnace by means of the ram or rams forces warmed or hot material within the furnace adjacent the arc region to shape better the crater formed and to enable a larger proportion of the radiant energy to heat the mixture and not the walls of the furnace. As a result of this arrangement of apparatus and of this method, the necessity of having a high temperature refractory lining can be eliminated. Moreover, the carbon linings can be made thinner to afford equal wear or linings of conventional thickness can be used which exhibit a great increase in life. Furthermore, supplying hot raw material to the reaction zone rather than dumping cold feed into said zone maintains the efficiency of the process and permits better control of the particle size to be obtained.

It, of course, is also apparent that the apparatus and method disclosed herein will be very useful in the continuous production of silicon dioxide. As the reaction mixture is consumed in the furnace it can be continuously renewed from the supply hopper by means of the ram. Also, a number of collection bags can be supplied in parallel or otherwise to the system so that as soon as one is filled another may take its place. Moreover, the electrodes may be supplied continuously and the oxidizing gas supply can be fixed at the desired rate. Hence, once the desired oxidizing gas velocity and volume have been established and the feed supply determined for the desired average particle size to be obtained and when the system has reached equilibrium, the only materials that need be added will be the electrodes, feed mixture, oxidizing gas and cooling water for the electrodes and jet ring.

While an arc furnace has been shown in the drawings and is the preferred type of furnace to use, it is apparent that other types of high temperature furnaces such as a resistance furnace and the like may be employed which are useful in the reaction producing silicon monoxide. Other changes and modifications can also be made in the furnace and its attendant apparatus and in the method. For example, the ram may be replaced with a screw conveyor, etc. It will be understood that the ram serves to press the dry aggregate 10 and thereby force plastic or molten layer or wall 62 of material immediately adjacent reaction zone 63 to form the optimum size and best conditions for the reaction zone. The reaction zone should be enclosed as much as possible but leaving the ends of the electrodes exposed to maintain the arc and sufficient space to permit the gases to readily pass out of port 9. Moreover, that portion of the furnace or reaction chamber defining port 9 may be replaced by the jet ring. However, it is preferred to have the jet ring supported by the carbon roof of the reaction chamber or furnace or by other means to aid in insulating the ring somewhat from the high temperatures in the reaction chamber. Moreover, although cover member 11 is shown as supported by feed channels 20 and 35, it is obvious that it can be attached to or made integral with the other walls and other roof portions of reaction chamber 4 and need not be supported by the feed channels.

While a single phase furnace using two electrodes has been shown in the drawings, it is apparent that a 3-phase furnace employing three electrodes spaced about 120° apart in the furnace can also be used especially for purposes of economy. Moreover, while the electrodes have been shown as being positioned horizontally or parallel to the base of the furnace, they can be inclined downward to the furnace base to increase thermal efficiency.

The jet ring placed on top of the furnace port should have a restricted central opening to increase the velocity of the silicon monoxide gas through the ring as this increases the surface area of the resultant product, reduces radiation losses and permits more rapid cooling. Moreover, it has been found that for a given set of operating conditions an increase in the number of holes for passage of the oxidizing gas with a consequent increase in the volume of the oxidizing gas will provide a product with a higher surface area. The holes should preferably be evenly spaced from each other and preferably be at the same relative height with respect to the horizontal base of the ring to enable convergence of the jets at the same point otherwise adjustments in angle will be needed. Furthermore, the angle at which the oxidizing gas and the silicon monoxide gas impinge is important in determining particle size. It has been found desirable to position the oxidizing gas passages in the jet ring at an angle of about 45° to the transverse axis of the ring. While larger or smaller angles may be employed, angles as high as 90° to the transverse axis of the jet ring, where the oxidizing gas streams are essentially parallel to the monoxide gas stream, are undesirable as they tend to draw air into the furnace proper through the refractory and carbon lining to create a vacuum in the furnace and also to decrease the rate of mixing to produce large particles of low surface area. On the other hand, angles as low as 1-2° to the transverse axis of the jet ring are too flat and tend to create a back pressure and slow down production while also producing large particles of small surface area. Furthermore, the walls of the central passage of the ring may be straight and the gas holes drilled or formed therein at the desired angle. A narrow slit may be used in place of a plurality of holes for the oxidizing gases. Moreover, the baffle may be eliminated from the air chamber of the air mixer if desired. Instead of positioning water chamber 41 below air chamber 42, it can be placed around the outside circumference of the air chamber or even be slightly above so long as the air mixer is cooled. If desired the coolant chamber may be omitted and the air chamber increased in size to provide for a high rate of oxidizing gas to not only cool the jet ring but also to provide the required quantity of air or other medium for oxidizing the silicon monoxide gas. However, it is preferable to employ a separate cooling chamber using a fluid such as water or other medium having high heat conductivity. The chambers containing the coolant and air supply are preferably annular but can take other shapes so long as the required cooling effect and air pressure are maintained and as long as channel 40 is generally cylindrical and the jets generally form a cone. Also, the passage for increasing the flow of gases from the furnace need not be positioned centrally in the gas mixer itself but may be disposed in other positions as long as it functions to increase gas flow from the furnace.

The oxidizing gases employed are air, oxygen, steam, or carbon dioxide, mixtures thereof, or other oxidizing gas or gases which will oxidize silicon monoxide to silicon dioxide. The gas may be heated but should be at a temperature considerably less than the temperature of the silicon monoxide-carbon monoxide gas stream to adequately cool the stream for otherwise a larger amount of oxidizing gas will be required. Preferably, the oxidizing gas is air at about room temperature. The oxidizing gas should mix with the silicon monoxide gas stream in a quantity sufficient to oxidize the silicon monoxide to silicon dioxide, and to dilute and to solidify the resulting particles of silicon dioxide. It has been found that an increase in the velocity of the oxidizing gas, other things being equal, will provide particles of higher surface area and smaller size. Silicon dioxide of a particle size and surface area within the purview of the present invention has been obtained using oxidizing gas velocities of from about 50 to 600 cubic feet per pound of product obtained.

The silica used in the arc reduction process herein described may be sand, quartz or mineral silicates which do not contain impurities which would form products to adversely affect the properties of the resulting particulate silicon dioxide. The carbon employed may be anthracite coal, carbon black, coal coke or petroleum coke essentially free of volatiles and other matter which would provide deleterious amounts of impurities. Silicon metal or silicon carbide may also be used in place of carbon in the reduction process. However, it is preferred to use anthracite, coke or carbon and sand. While mole ratios of about 1:1 sand to carbon are generally used in the furnace, these ratios may be varied somewhat with obtainment of satisfactory results. However, wide variations in mol ratios are not desired as such may tend to produce SiC or Si or result in an accumulation of large amounts of unreacted sand or $SiO_2$ in the reaction chamber. Moreover, it is preferred not to use fluxes in the reaction mixture because, for a given set of operating conditions, fluxes increase the particle size or reduce the surface area of the resulting silicon dioxide particles and they tend to reduce the melting point of the particles and render them harder to solidify. Electric power may be supplied as needed depending on the amount of product desired, etc.

Although all of the factors controlling obtainment of particle size using the novel method and apparatus of the present invention may not precisely be known, it is believed that the problem consists in condensing the gaseous silicon containing material to a solid with a controlled amount of agglomeration. It would appear that since no agglomeration is possible while the silicon monoxide is a gas and as very little change occurs after the product is solid, only the transition through the molten state has to be carefully controlled. Hence, the method and apparatus of the present invention serve three purposes. There are provided the quantities of oxidizing gas required at the throat of the furnace for further chemical reaction to oxidize silicon monoxide to silicon dioxide, a gaseous quenching medium to quench the silicon dioxide below its melting point and a gaseous diluent to separate the particles and reduce the frequency of interparticle contact. Since all three occur apparently during a fraction of a second, speed and efficiency of mixing are important. Accordingly, for a given set of furnace conditions, any action that results in more rapid cooling and dilution with the desired degree of oxidation will give smaller particle size and larger surface area. Using the method and apparatus disclosed herein it is possible to obtain silicon dioxide of an average particle size of from about 5 to 50 millimicrons and of an average surface area of from about 80 to 350 square meters per gram. Moreover, using the method and apparatus disclosed herein it is possible to control the particle size and surface area so that a product of the desired range is obtained. It, of course, is to be understood that if desired the method and apparatus of the present invention can be used to produce coarser grades of silicon dioxide. The product of the present invention exhibits the halo of amorphous silicon dioxide on X-ray diffraction analysis.

The following examples will serve to illustrate the invention with more particularity to those skilled in the art:

*Example I*

A stoichiometric mixture of 80.5% sand (99.5+ percent $SiO_2$) and 19.5% anthracite coal (90+ percent carbon) needed for the reduction reaction

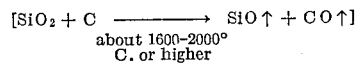
about 1600–2000° C. or higher after correcting for impurities in the coal, carbon from the electrodes and moisture from the feed, was charged to an arc furnace having a carbon lined reaction chamber of internal dimensions of about 16½ x 9 x 8 inches. The port had a diameter of about 4" and the inside diameter of the jet ring was about 1¾". The jet ring contained about 50 equally spaced holes drilled with a No. 48 drill for providing the air jets. The angle of the jets was 45°. An arc was struck in the furnace and power supplied at an average of about 48 kw. at 90 volts and water was circulated through the cooling chamber of the ring. Air at room temperature then was pumped into the jet ring and passed through the jets at a rate of about 110 cubic feet per minute. After operating for about 100 minutes, 16 pounds of particulate solid silicon dioxide having an average surface area of 254 square meters per gram and an average particle size of about 10 millimicrons was produced. The average power requirement was about 4.9 kwh. per pound of product.

*Example II*

The method of this example was substantially similar to Example I, above, except that the reaction time was varied and the air was passed through the jet passages at a rate of 62 cu. ft. per min. The resulting particulate silicon dioxide exhibited an average surface area of 109 sq. meters/gm. and an average particle size of about 25 millimicrons. When the air rate was increased to 71 cu. ft./min., the average surface area of the silicon dioxide was found to be 165 sq. meters per gram. It had an average particle size of about 16 millimicrons. Further increasing the air rate to 120 cu. ft./min., increased the average surface area to 320 m.$^2$/g. and reduced the average particle size to about 8 millimicrons. Hence, it is apparent that an increase in air velocity results in an increase in the surface area and a reduction in particle size realized where the other operating conditions in the furnace and method remain constant.

*Example III*

The method of this example was similar to Example I, above, except that the air velocity was maintained constant and the number of jets or air passages in the jet ring were varied. After 150 minutes' operation using a jet ring with 53 air passages at an angle of 45° positioned around its upper internal surface, a particulate silicon dioxide was obtained having an average surface area of about 114 m.$^2$/g. and an average particle size of about 23 millimicrons. When the same run was repeated and the jet ring replaced with one having 78 air passages at an angle of 45° positioned around its upper internal surface, the resulting particulate silicon dioxide had an average surface area of about 160 m.$^2$/g. and an average particle size of about 17 millimicrons. An increase in the volume of oxidizing gas used to contact the silicon monoxide gas, thus, provides an increase in surface area and a reduction in particle size.

*Example IV*

The method of this example was similar to Example I, above, except that the opening or internal diameter of the jet rings and the flow rates of the oxidizing gas were varied. With a jet ring having an opening of an internal diameter of 2½", 45° angle, and an air rate of about 124 cu. ft./min., the resulting particulate silicon dioxide after a six hour run had an average surface area of 150 m.$^2$/g. and an average particle size of about 18 millimicrons. When the jet ring was replaced with one having an internal diameter of 1¾" and with an air rate of only 85 cu. ft./min., the silicon dioxide had an average surface area of 215 m.$^2$/g. and an average particle size of about 12 millimicrons. When the smaller ring was used at an air rate of 80 cu. ft./min., the resulting product exhibited an average surface area of 170 m.$^2$/g. and an average particle size of about 16 millimicrons. The feed mixture in the latter two runs contained about 5% by weight of a flux (lime). Accordingly, despite the decrease in air flow, jet rings of relatively smaller internal diameter which increase the rate of flow of the gas from the furnace facilitate the obtainment of increased surface area and reduced size of the silicon dioxide particles.

*Example V*

The method of this example was similar to that of Example I, above, except that runs were conducted with and without flux. With about 5% by weight of lime as flux in the reaction mixture, silicon dioxide having an average surface area of 170–185 m.$^2$/g. and a particle size in the range of about 16 to 14 millimicrons was obtained whereas when the flux was omitted the silicon dioxide had an average surface area of 180–200 m.$^2$/g. and an average particle size in the range of 15–13 millimicrons. In another run when using flux in the reaction mixture and an air flow rate of 80 cu. ft./min. through the jet ring, a silicon dioxide was obtained having a surface area of about 170 m.$^2$/g. and an average particle size of about 16 millimicrons. On the other hand when the flux was omitted from the reaction mixture, only 71 cu. ft./min. of air was required to provide a silicon dioxide having the same average surface area and particle size.

In summary, the present invention teaches that particulate silicon dioxide of the desired average particle size and average surface area can readily be prepared by controlling the velocity with which the silicon monoxide leaves the furnace and by controlling the velocity, volume and direction of the oxidizing gases. By use of the present method and apparatus very finely divided silicon dioxide of high surface area and small particle size can be obtained. Furthermore, the method and apparatus provide for the continuous production of silicon dioxide of a desired average surface area and particle size and for increasing the thermal efficiency of the reaction. The products produced by the method and apparatus disclosed herein will find utility in rubbery and plastic compositions, refractories, ceramics, insulating compositions and the like.

What is claimed is:

1. An apparatus useful in mixing gases comprising, in combination, a container partitioned in section to provide a mutual wall separating two chambers, one of said chambers having inlet and outlet means for the circulation of a coolant, the other of said chambers being in heat exchange relationship with said first named chamber, having inlet means for receiving a gas and having an inner wall defining a generally cylindrical centrally disposed passageway through said second named chamber, and an annular baffle disposed in said second named chamber to distribute gas throughout said second named chamber, said inner wall of said second named chamber having a generally circumferential outlet in communication with said second named chamber and with said passageway, and said circumferential outlet extending through said wall being at an angle sufficient to the transverse axis of said passageway to direct gas from said outlet to converge at about the same point adjacent said passageway and to mix with a stream of gas conducted by said passageway without causing an appreciable change in the pressure of the gas entering said passageway.

2. An apparatus useful in mixing gases comprising, in combination, a generally cylindrical container partitioned in section to provide a mutual wall separating two chambers, one of said chambers having inlet and outlet means for the circulation of a coolant and having a centrally disposed continuous annular inner wall, the other of said chambers being in heat exchange relationship with said first named chamber, having inlet means for receiving a gas and a centrally disposed annular inner wall, said inner walls of said chambers being in axial alignment to form a substantially continuous axial passageway extending entirely through said chambers, and an annular baffle disposed within said second named chamber radially spaced from and extending substantially circumferentially about said inner wall of said second named chamber to evenly distribute gas throughout said second named chamber, said inner wall of said second named chamber having therein a plurality of outlets in communication with said second named chamber and with said continuous passageway, said outlets being substantially equidistant from each other circumferentially and each of said outlets extending through said inner wall being at an angle of from greater than 2° to less than 90° relative to the transverse axis of said continuous passageway in order to direct gas from said outlets to converge at essentially the same point adjacent said continuous passageway and to impinge upon a stream of gas conducted by said continuous passageway without causing a substantial change in the pressure of the gas entering said continuous passageway.

3. An apparatus useful in mixing gases comprising, in combination, a generally cylindrical container partitioned in section to provide a mutual wall separating two chambers, one of said chambers having inlet and outlet means for the circulation of a coolant and having a centrally disposed continuous annular inner wall, the other of said chambers being in heat exchange relationship with said first named chamber and having inlet means for receiving a gas and a centrally disposed annular inner wall in axial alignment with the inner wall of said first named chamber to form a centrally disposed, substantially continuous axial passageway extending entirely through said chambers, the portion of said second named wall adjacent said first named wall having essentially the same circumference as said first named wall and the portion of said second named wall remote from said first named wall being beveled outward to provide a frusto-conical surface having a circumference greater than the circumference of the remaining portion of said second named wall, an annular baffle positioned within said second named chamber radially spaced from and extending substantially circumferentially about said inner wall of said second named chamber to evenly distribute gas throughout said second named chamber, said beveled portion of said second named wall having a plurality of outlets in communication with said second named chamber and with said continuous passageway, said outlets being substantially equidistant from each other circumferentially and each of said outlets extending through said beveled portion of said inner wall being at an angle of about 45° relative to the transverse axis of said continuous passageway to direct streams of gas to converge at essentially the same point adjacent said continuous passageway and to mix with a stream of gas conducted by said continuous passageway, and annular wear resistant means having an annular centrally disposed surface forming an opening having a diameter substantially equal to the diameter of the opening formed by said frusto-conical surface and in axial alignment with said passageway and being secured to the outer surface of said container adjacent said second named chamber.

4. In an apparatus having a reaction chamber, means to conduct reactions at elevated temperatures in said apparatus, and a port in said apparatus to permit a gaseous reaction product to escape from said reaction chamber, the improvement comprising a container useful for mixing gases vertically positioned above said reaction chamber and about said port and being partitioned in section to provide a mutual wall separating two chambers, one of said chambers having inlet and outlet means for the circulation of a coolant, the other of said chambers being secured in heat exchange relationship with said first named chamber and having inlet means for receiving a gas and having an inner wall defining a generally cylindrical centrally disposed passageway through said second named chamber, and an annular baffle disposed in said second named chamber to distribute gas throughout said second named chamber, said inner wall of said second named chamber having a generally circumferential outlet in communication with said second named chamber and with said passageway, said circumferential outlet extending through said wall being at an angle sufficient to the transverse axis of said passageway to direct gas from said outlet to converge at about the same point adjacent said passageway and to mix with a stream of gas conducted by said passageway without causing an appreciable change in the pressure of the gas entering said passageway, and said first named chamber being positioned between said port and said second named chamber.

5. In an apparatus according to claim 4, a scraper having a scraping surface substantially conformable to the inner surface of said passageway and mounted for vertical movement into and out of and for rotation in said passageway adjacent said outlet of said second named chamber to remove deposits of solid material adjacent said second named chamber and said pasageway in order to avoid interruption in the desired functioning of said apparatus.

6. In a furnace having a reaction chamber, means to conduct reactions at elevated temperatures in said reaction chamber, and a port in said furnace to permit a gaseous reaction product to escape from said reaction chamber, the improvement comprising a container useful for mixing gases vertically positioned above said reaction chamber and about said port and being partitioned in section to provide a mutual wall separating two chambers, one of said chambers having inlet and outlet means for the circulation of a coolant and having a centrally disposed continuous annu inner wall, the other of said chambers being in heat exchange relationship with said first named chamber and having inlet means for receiving a gas and a centrally disposed annular inner wall, said inner walls of said chambers being in axial alignment to form a substantially continuous axial passageway extending entirely through said chambers, and an annular baffle disposed within said second named chamber radially spaced from and extending substantially circumferentially about said inner wall of said second named chamber to evenly distribute gas throughout said second named chamber, said inner wall of said second named chamber having therein a plurality of outlets in communication with said second named chamber and with said continuous passageway, said outlets being substantially equidistant from each other circumferentially and each of said outlets extending through said inner wall being at an angle of from greater than 2° to less than 90° relative to the transverse axis of said continuous passageway in order to direct gas from said outlets to converge at essentially the same point adjacent said continuous passageway and to impinge upon a stream of gas conducted by said continuous passageway without causing a substantial change in the pressure of the gas entering said continuous passageway, and said first named chamber being positioned between said port and said second named chamber.

7. An arc furnace useful for reacting a silicon containing material and a reducing agent and having a reaction chamber, electrodes positioned within said reaction chamber for conducting reactions at elevated temperatures, a port within said furnace to permit a composition comprising a gas to escape from said reaction chamber, a container useful for mixing a gas with said gaseous composition to condense at least a portion of the same to the solid state and being vertically positioned above said reaction chamber and about said port and being partitioned in section to provide a mutual wall separating two chambers, one of said chambers having inlet and outlet means for the circulation of a coolant and having a centrally disposed continuous annular inner wall, the other of said chambers being secured in heat exchange relationship with said first named chamber, having inlet means for receiving a gas and a centrally disposed annular inner wall in axial alignment with the inner wall of said first named chamber to form a centrally disposed, substantially continuous axial passageway extending entirely through said chambers, the portion of said second named wall adjacent said first named wall having essentially the same circumference as said first named wall and the portion of said second named wall remote from said first named wall being beveled outward to provide a frusto-conical surface having a circumference greater than the circumference of the remaining portion of said second named wall, an annular baffle positioned within said second named chamber radially spaced from and extending substantially circumferentially about said inner wall of said second named chamber to evenly distribute gas throughout said second named chamber, said beveled portion of said second named wall having a plurality of outlets in communication with said second named chamber and with said continuous passageway, said outlets being substantially equidistant from each other circumferentially and each of said outlets extending through said beveled portion of said inner wall being at an angle of about 45° relative to the transverse axis of said continuous passageway to direct streams of gas to converge at essentially the same point adjacent said continuous passageway and to mix with a stream of gas conducted by said continuous passageway, said first named chamber being positioned between said port and said second named chamber, annular wear resistant means having an annular centrally disposed surface forming an opening having a diameter substantially equal to the diameter of the opening formed by said frustoconical surface and in axial alignment with said passageway and being secured to the outer surface of said container adjacent said second named chamber, means to convey a mixture of gas and solid material away from said container and means to separate said gas from said solid material.

References Cited in the file of this patent

UNITED STATES PATENTS

| | | |
|---|---|---|
| 1,313,746 | Shipton | Aug. 19, 1919 |
| 1,428,909 | Rennerfelt | Sept. 12, 1922 |
| 2,121,463 | Wisdom | June 21, 1938 |
| 2,428,178 | Reik et al. | Sept. 30, 1947 |
| 2,492,481 | Kaufmann et al. | Dec. 27, 1949 |
| 2,573,057 | Porter | Oct. 30, 1951 |